US009408196B2

(12) United States Patent
Li et al.

(10) Patent No.: US 9,408,196 B2
(45) Date of Patent: Aug. 2, 2016

(54) METHOD AND TERMINAL FOR FEEDING BACK CHANNEL STATE INFORMATION

(75) Inventors: Ruyue Li, Shenzhen (CN); Jun Xu, Shenzhen (CN); Yijian Chen, Shenzhen (CN); Ke Cai, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 147 days.

(21) Appl. No.: 13/704,941

(22) PCT Filed: Jan. 11, 2011

(86) PCT No.: PCT/CN2011/070185
§ 371 (c)(1),
(2), (4) Date: Dec. 17, 2012

(87) PCT Pub. No.: WO2011/160451
PCT Pub. Date: Dec. 29, 2011

(65) Prior Publication Data
US 2013/0094464 A1   Apr. 18, 2013

(30) Foreign Application Priority Data
Jun. 21, 2010   (CN) .......................... 2010 1 0211835

(51) Int. Cl.
*H04W 72/04*   (2009.01)
*H04L 25/03*   (2006.01)
(Continued)

(52) U.S. Cl.
CPC ......... *H04W 72/0413* (2013.01); *H04B 7/0478* (2013.01); *H04B 7/065* (2013.01);
(Continued)

(58) Field of Classification Search
CPC ...... H04B 7/066; H04B 7/0478; H04B 7/065; H04B 7/0639; H04L 5/0035; H04L 5/0053; H04L 5/0057; H04L 25/03343; H04L 1/0006; H04L 1/0031; H04L 1/0026; H04L 2025/03426; H04L 2025/03808; H04L 5/0023; H04W 72/0413
See application file for complete search history.

(56) References Cited

U.S. PATENT DOCUMENTS

2009/0059844 A1   3/2009   Ko et al.
2009/0190528 A1*  7/2009   Chung et al. .................. 370/328
(Continued)

FOREIGN PATENT DOCUMENTS

CN   101399640 A   4/2009
CN   101689904 A   3/2010
(Continued)

OTHER PUBLICATIONS

International Search Report (Form PCT/ISA/2010) for PCT/CN2011/070185, dated Apr. 21, 2011.
(Continued)

*Primary Examiner* — Jae Y Lee
(74) *Attorney, Agent, or Firm* — Koppel, Patrick, Heybl & Philpott

(57) ABSTRACT

The disclosure provides a method and terminal for feeding back channel state information. The method comprises: a UE determining channel state information comprising a first type of PMI and a second type of PMI, wherein the first type of PMI is used for indicating an index of a first precoding matrix in a first precoding codebook, the first precoding matrix is used for mapping channel information of a wideband and/or long-term channel, the second PMI is used for indicating an index of a second precoding matrix in a second precoding codebook, the second precoding matrix is used for mapping channel information of a subband and/or short-term channel; the UE feeding back the channel state information on a PUSCH. The disclosure enables a base station to dynamically select SU-MIMO or MU-MIMO transmission according to the practical channel condition so as to effectively improve the system performance.

10 Claims, 3 Drawing Sheets

(51) Int. Cl.
  *H04B 7/04* (2006.01)
  *H04L 1/00* (2006.01)
  *H04L 5/00* (2006.01)
  *H04B 7/06* (2006.01)

(52) U.S. Cl.
  CPC ............. *H04B 7/066* (2013.01); *H04L 1/0006* (2013.01); *H04L 1/0031* (2013.01); *H04L 5/0035* (2013.01); *H04L 5/0053* (2013.01); *H04L 5/0057* (2013.01); *H04L 25/03343* (2013.01); *H04B 7/0639* (2013.01); *H04L 1/0026* (2013.01); *H04L 5/0023* (2013.01); *H04L 2025/03426* (2013.01); *H04L 2025/03808* (2013.01)

(56) References Cited

U.S. PATENT DOCUMENTS

| | | | | |
|---|---|---|---|---|
| 2009/0262854 | A1* | 10/2009 | Lee et al. | 375/267 |
| 2009/0323613 | A1* | 12/2009 | Frederiksen et al. | 370/329 |
| 2010/0239036 | A1* | 9/2010 | Koo et al. | 375/260 |
| 2012/0224652 | A1* | 9/2012 | Chen et al. | 375/296 |
| 2013/0028345 | A1* | 1/2013 | Ko et al. | 375/267 |

FOREIGN PATENT DOCUMENTS

| | | |
|---|---|---|
| CN | 101826951 A | 9/2010 |
| CN | 101877627 A | 11/2010 |
| EP | 2624491 A1 | 7/2013 |
| JP | 2010534442 | 11/2010 |
| WO | WO 2009002087 | 12/2008 |
| WO | WO2009/096708 A1 | 8/2009 |

OTHER PUBLICATIONS

Extended European Search Report from European Appl. No. 11797482.4-1851, dated Nov. 8, 2013.

Notice of Reasons for Rejection from Japanese Appl. No. 2013-515675, dated Jun. 3, 2014.

Ah Chairman: Summary of AH on AI 6.3.4 "UE Procedures for downlink shared channel", 36PP TSG RAN WG1 Meeting #52, Sorrento. Italy, Feb. 11-15, 2008, R1-081137.

* cited by examiner

METHOD AND TERMINAL FOR FEEDING BACK CHANNEL STATE INFORMATION

FIELD OF THE INVENTION

The disclosure relates to the communication field and in particular to a method and a terminal for feeding back channel state information (CSI).

BACKGROUND OF THE INVENTION

As an evolved standard of Long Term Evolution (LTE), a Long Term Evolution Advanced (LTE-A) system supports larger system bandwidth (the largest bandwidth being 100 MHz) and is backward compatible with the existing LTE standard. In order to increase the coverage and throughput of cell edges, based on the existing LTE system, the LTE-A proposes a cooperative Multiple Input Multiple Output (MIMO) technology, also known as a Coordinated Multipoint Transmission and Reception (COMP), which is able to increase the spectrum utilization efficiency of an International Mobile Telecommunications-Advanced (IMT-Advanced) system and alleviate shortage of spectrum resources.

In wireless telecommunications, if multiple antennas are used at a transmitting node (e.g. node eNB), the transmission rate can be increased by spatial multiplexing, in which different data are transmitted at different antenna positions on the same time frequency resource of the transmitting node. Also, multiple antennas are used at a receiving terminal (e.g. a piece of User Terminal (UE)). In one case, resources of all antennas are allocated to the same user in a single user condition, i.e. in one transmission interval, one user device separately occupies all physical resources allocated to the user device, and this transmission mode is called Single-User MIMO (SU-MIMO). In another case, resources of different antenna spaces are allocated to different users in a multi-user condition, i.e. in one transmission interval, one user device and at least one other user device share physical resources allocated to these user devices, the one user device and other user devices share the same physical resource, which can be a time-frequency resource, via space division multiple access or space division multiplexing, and this transmission mode is called Multi-User MIMO (MU-MIMO).

In the LTE technology of the $3^{rd}$ Generation Partnership Project (3GPP), a UE is set semi-statically via a high layer signalling to perform transmission based on one of the following transmission modes, such as:
Mode 1: single-antenna port: port 0;
Mode 2: transmit diversity;
Mode 3: open-loop spatial multiplexing;
Mode 4: closed-loop spatial multiplexing;
Mode 5: Multi-user MIMO;
Mode 6: closed-loop rank=1 precoding; and
Mode 7: single-antenna port: port 5.

The UE feeds back different channel state information to the transmitting node according to different transmission modes, and then the transmitting node (eNB) performs scheduling according to the channel state information fed back by the terminal (UE), and configures new channel state information for actual transmission according to a certain principle (e.g. a maximum capacity principle). The fed-back channel state information comprises: Channel Quality Indication (CQI) information, Precoding Matrix Indicator (PMI) information and Rank Indicator (RI) information.

The CQI is an index for measuring the quality of a downlink channel. In the 36-213 protocol, the CQI is expressed by integer values of 0 to 15 which respectively represent different CQI levels. Different CQIs are corresponding to their respective modulation and coding schemes (MCS).

The RI is used for describing the number of spatial independent channels and is corresponding to the rank of a channel response matrix. Under the open-loop spatial multiplexing mode and the closed-loop spatial multiplexing mode, the UE needs to feed back the RI information, and the RI information does not need to be fed back under other modes.

The PMI is an index number of a precoding codebook fed back by the UE. Under the closed-loop spatial multiplexing mode, the MU-MIMO mode and the R1=1 closed-loop mode, the PMI information needs to be fed back and the PMI information is not fed back under other transmission modes.

At present, the channel state information is fed back via a certain number of bits (e.g. 4 bits) in the related technology, which is mainly applied to the SU-MIMO transmission mode; therefore, the fed-back information is simple with low precision. However, with the development of communication technologies, the transmission mode of dynamic switching between the SU-MIMO and the MU-MIMO is applied more and more widely in the LIE-A, and this transmission mode has higher requirements for the contents and precision of the fed-back channel state information. The original feedback method can no longer meet the requirement of the LTE-A system, especially the requirement for high precision of the channel state information under the transmission mode of dynamic switching between the SU-MIMO and the MU-MIMO.

SUMMARY OF THE INVENTION

The disclosure provides a method and a terminal for feeding back channel state information, which solve the problem in the related technology that the original feedback method can no longer meet the requirement of the LTE-A system, especially the requirement for high precision of the channel state information under the transmission mode of dynamic switching between the SU-MIMO and the MU-MIMO.

According to one aspect of the disclosure, a method for feeding back channel state information is provided.

The method for feeding back channel state information according to the disclosure comprises: a piece of user equipment (UE) determining channel state information which comprises a first type of Precoding Matrix Indicator (PMI) and a second type of PMI, wherein the first type of PMI is used for indicating an index of a first precoding matrix in a first precoding codebook, the first precoding matrix is used for mapping channel information of a wideband and/or long-term channel, the second type of PMI is used for indicating an index of a second precoding matrix in a second precoding codebook, and the second precoding matrix is used for mapping channel information of a subband and/or short-term channel; and the UE feeding back the channel state information which comprises the first type of PMI and the second type of PMI on a Physical Uplink Shared Channel (PUSCH).

According to another prospect of the disclosure, a terminal is provided. The terminal according to the disclosure comprises: a determining module, configured to determine channel state information which comprises a first type of PMI and a second type of PMI, wherein the first type of PMI is used for indicating an index of a first precoding matrix in a first precoding codebook, the first precoding matrix is used for mapping channel information of a wideband and/or long-term channel, the second type of PMI is used for indicating an index of a second precoding matrix in a second precoding codebook, and the second precoding matrix is used for mapping channel information of a subband and/or short-term channel; and a feedback module, configured to feed back the channel state information which comprises the first type of PMI and the second type of PMI on a PUSCH.

In accordance with the disclosure, the necessary first type of PMI and/or second type of PMI under the transmission mode of dynamic switching of SU-MIMO and MU-MIMO are included in the channel state information, thus increasing the precision of the channel state information fed back by the UE, so that the base station is able to dynamically select the SU-MIMO transmission or the MU-MIMO transmission according to the practical channel condition so as to effectively improve the system performance.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

Figure 1:
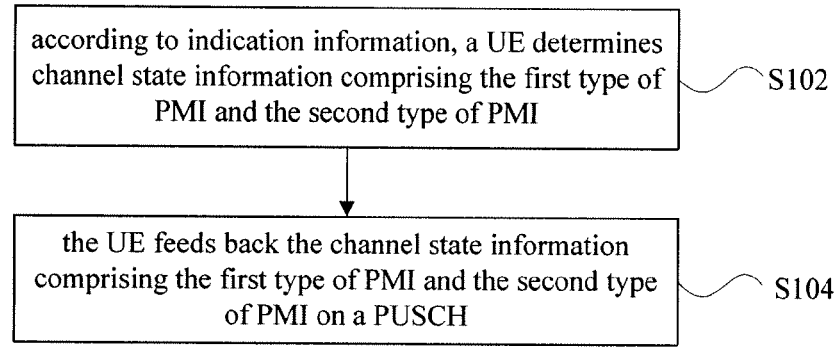
FIG. 1 is a flowchart illustrating a method for feeding back channel state information according to an embodiment of the disclosure.

It should be noted that, if there is no conflict, the embodiments of the disclosure and the characteristics in the embodiments can be combined with one another. The disclosure will be described in details below with reference to the accompanying drawings and in combination with the embodiments.

To understand the disclosure, channel state information fed back by a UE in the embodiments of the disclosure is introduced below first.

The fed-back channel state information comprises: CQI information, PMI information and RI information.

The CQI is an index for measuring the quality of a downlink channel. In the 36-213 protocol, the CQI is expressed by integer values of 0 to 15 which respectively represent different CQI levels. Different CQIs are corresponding to their respective MCSs.

The RI is used for describing the number of spatial independent channels and is corresponding to the rank of a channel response matrix. Under the open-loop spatial multiplexing mode and the closed-loop spatial multiplexing mode, the UE needs to feed back the RI information, and the RI information does not need to be fed back under other modes.

The PMI is an index number of a precoding codebook fed back by the UE. Under the closed-loop spatial multiplexing mode, the MU-MIMO mode and the R1=1 closed-loop mode, the PMI information needs to be fed back and the PMI information is not fed back under other transmission modes.

More specifically, there are various CQI definitions in the LTE. The CQI can be classified according to different principles. One classification method comprises that: the CQI is classified as wideband CQI and subband CQI according to the measured bandwidth. The wideband CQI and the subband CQI are explained as follows:

the wideband CQI refers to channel state indication of all subbands and the CQI information of a subband set S is obtained;

the subband CQI refers to the CQI information aiming at each subband. According to different system bandwidths, the LTE divides Resource Blocks (RBs) corresponding to an effective bandwidth into several RB groups, each of which is called a subband.

The subband CQI can be further classified as full subband CQI and Best M CQI: the full subband CQI report the CQI information of all subbands; the Best M CQI means that M subbands are selected from the subband set S, the CQI information of these M subbands is reported and the location information of the M subbands is reported simultaneously.

Another classification method comprises that: the CQI is classified as single-stream CQI and dual-stream CQI according to the number of codeword streams. The single-stream CQI and the dual-stream CQI are explained as follows:

single-stream CQI: applied to single-antenna transmission port 0 and port 5, transmit diversity, MU-MIMO, R1=1 closed-loop spatial multiplexing, and the UE reports the CQI information of an individual codeword stream at the moment;

dual-stream CQI: applied to the closed-loop spatial multiplexing mode. For an open-loop spatial multiplexing mode, since the channel state information is unknown and equalization processing is performed for dual-stream channel information during the precoding process, the CQIs of two codeword streams are equal under the open-loop spatial multiplexing mode.

A third classification method is that: the CQI is classified as absolute CQI and differential CQI.

The absolute CQI refers to a CQI index expressed by 4 bits.

The differential CQI refers to a CQI index expressed by 2 bits or 3 bits, and the differential CQI is furthered classified as the differential CQI of the second codeword stream relative to the first codeword stream, and the differential CQI of a subband CQI relative to another subband CQI.

A fourth classification method is that: the CQI is classified as wideband CQI, UE-selected (subband CQI), and high layer configured (subband CQI) according to CQI reporting methods.

The wideband CQI refers to the CQI information of the subband set S.

The UE selected (subband CQI), i.e. the Best M CQI feeds back the CQI information of the selected M subbands and reports the locations of the M subbands simultaneously.

The high layer configured (subband CQI), i.e. the full subband CQI feeds back one piece of CQI information aiming at each subband.

Both the high layer configured mode and the UE selected mode are feedback modes of the subband CQI, and the subband sizes defined by these two feedback modes are different under the aperiodic feedback mode. Under the UE selected mode, the size of M is further defined, see Table 2 and Table 3.

TABLE 2

Table indicating the subband size under the high layer configured mode

| System bandwidth $N_{RB}^{DL}$ | Subband size (k) (RBs) |
|---|---|
| 6-7 | NA |
| 8-10 | 4 |
| 11-26 | 4 |
| 27-63 | 6 |
| 64-110 | 8 |

TABLE 3

Table indicating the subband size and the M value under the UE selected mode

| System bandwidth $N_{RB}^{DL}$ | Subband size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In the LTE system, the feedback of CQI/PMI and RI can be periodic feedback or aperiodic feedback and the specific feedback is shown in Table 4.

TABLE 4

Table indicating uplink physical channels corresponding to periodic feedback and aperiodic feedback

| Scheduling mode | Periodical CQI reporting channel | Aperiodic CQI reporting channel |
|---|---|---|
| Frequency non-selective | Physical Uplink Control Channel (PUCCH) | |
| Frequency selective | PUCCH | PUSCH |

For the periodically fed-back CQI/PMI and RI, if the UE does not need to send data, the periodically fed-back CQI/PMI and RI are transmitted in a 2/2a/2b (PUCCH format2/2a/2b) format on a PUCCH; if the UE needs to send data, the CQI/PMI and RI are transmitted in a PUSCH. The aperiodically fed-back CQI/PMI and RI can only be transmitted on a PUSCH.

The important channel information above, i.e. the PMI/RI/CQI, has the following two feedback types on the uplink:

periodic feedback, which refers to the feedback mainly carried on the PUCCH;

aperiodic feedback, which refers to the feedback carried on the PUSCH.

Here, we mainly discuss the aperiodic feedback on the PUSCH, which is also a kind of high precision feedback. The periodic feedback is configured necessarily while the aperiodic feedback, which is a kind of auxiliary feedback, is triggered aperiodically to increase the precision.

In Mode x-y, x indicates the feedback of the CQI, wherein x=1 indicates the feedback of the wideband CQI, x=2 indicates the feedback of the subband CQI, and x=3 indicates the high layer configured CQI feedback; y indicates the PMI feedback, wherein y=0 indicates that there is no PMI, y=1 indicates a single PMI and y=2 indicates a plurality of PMIs.

The closed-loop spatial multiplexing always supports feedback with PMI, therefore, the feedback modes on the PUSCH supported by the closed-loop spatial multiplexing are: Modes 1-2, 2-2 and 3-1.

During the actual feedback, the RI is also fed back in the same PUSCH sub-frame as the PUSCH sub-frame in which the CQI information and the PMI information is fed back. The RI is limited to a value in the range of 1 to N and N=min (Nt, Nr), wherein Nt indicates the number of transmitting antennas, and Nr indicates the number of receiving antennas.

The CQI feedback is classified as subband CQI and wideband CQI, i.e. a united CQI of a plurality of subbands, and the meanings of the subband CQI and the wideband CQI are respectively the CQI level which can be supported when it is assumed that transmission is performed using one subband on the downlink and the CQI level which can be supported when transmission is performed using a plurality of subbands on the downlink.

In addition, there can be 1 or 2 CQIs for the same resource unit. The number of the CQIs is mainly related to the RI. There is 1 CQI when RI=1, and there are 2 CQIs when RI>1. When 1 CQI is fed back, it occupies 4 bits; when 2 CQIs are fed back, the differential technique is applied to the second CQI, and the second CQI occupies 3 bits based on the difference relative to the first CQI. The maximum overhead is 11 bits, which is also the maximum overhead which can be supported when CSI is fed back on the PUCCH.

The LTE-A system, which is the evolution standard of the LTE, supports larger system bandwidths (the largest bandwidth being 100 MHz) and is backward compatible with the existing LTE standard. In order to increase the coverage and throughput of cell edges, based on the existing LTE system, as many as 8 antennas and RI=8 can be supported on the downlink by the LTE-A. In addition, some feedback enhancement techniques are proposed by the LTE-A, mainly to enhance the feedback precision of codebooks. In this way, spectrum utilization efficiency of the LTE-A system can be increased and shortages of spectrum resources can be alleviated.

The technology can be described as follows.

1) A precoding/feedback structure of one subband consists of two matrixes.

2) Each matrix in the two matrixes belongs to one independent codebook which is known by a base station and a UE in advance. The matrixes may change at different time on different subbands.

3) One matrix expresses the attribute on the wideband or the attribute of a long-term channel while the other one expresses the attribute on a determined frequency band or the attribute of a short-term channel.

4) The used matrix codebooks can be expressed in the form of a finite countable matrix set and each matrix is known for the UE and the base station.

Here, it can be seen that a structure based on double codebooks is put forward for feeding back channel information, which can be further described as follows.

For one subband or a plurality of united subbands which needs to feed back channel information, the UE feeds back at least two pieces of PMI information to the terminal, namely the first type of PMI and the second type of PMI respectively which are also denoted as PMI1 and PMI2 respectively, wherein PMI1 is corresponding to a codeword W1 in a codebook, and PMI2 is corresponding to a codeword W2 in another codebook. The base station side, which has the same information, finds the corresponding codeword W1 and codeword W2 in the codebooks after receiving PMI1 and PMI2, and acquires the channel information according to a predetermined function rule F(W1, W2).

It can be found that, in the LTE-A, under the transmission mode which supports SU/MU and in the wideband/multi-subband channel information which needs to be fed back, the channel information which needs to be transmitted comprises RI, PMI1, PMI2 and CQI.

To understand the disclosure, the channel state information fed back by the UE in an embodiment of the disclosure is introduced below first.

The fed-back channel state information comprises: CQI information, PMI information and RI information.

According to the semi-static configuration from the high layer, the UE feeds back the CQI/PMI/RI information periodically on the PUCCH and the applied feedback mode is as shown in Table 5.

In a multi-antenna system, the feedback overhead is too high if a channel response matrix is fed back directly. Or decomposition, e.g. Singular Value Decomposition (SVD) is performed for the channel response matrix to obtain the preferred precoding matrix to be fed back, which still results in high overhead. Therefore, some precoding codebook sets, which are known by the transmitting node and the receiving terminal, need to be constructed, and the obtained preferred precoding matrix is compared with the coding matrixes in the precoding codebook sets to select an index value corresponding to the closest precoding codebook and feed back the index value. In this way, the overhead can be greatly saved, and the fed-back index values of the precoding codebooks are the PMIs.

The feedback granularity of the PMI can be that: one PMI is fed back for the whole bandwidth or the PMI is fed back according to the subband. Two PMI feedback types are defined in the LTE protocol: single PMI and multiple PMIs. The single PMI can express the effective bandwidth $N_{RB}^{DL}$ of the whole system, or can express part of the RB subsets. The number of RBs expressed by the single PMI is configured semi-statically by the high layer.

One UE has a first type of PMI and a second type of PMI on one subband. The first type of PMI indicates a matrix W1, and the second type of PMI indicates another matrix W2. A precoding matrix W is a function of the two matrixes W1 and W2. W1 belongs to a codebook and W2 also belongs to a codebook. The first type of PMI is an index of a codebook and the second type of PMI is also an index of a codebook, wherein W1 has the wideband/long-term channel information and W2 has the subband/short-term information.

In the embodiments below, the first type of PMI is used for indicating an index of a wideband precoding matrix and the second type of PMI is used for indicating an index of a subband precoding matrix; or the first type of PMI is used for indicating an index of a long-term precoding matrix, and the second type of PMI is used for indicating an index of a short-term precoding matrix; or the first type of PMI is used for indicating an index of a long-term and wideband precoding matrix, and the second type of PMI is used for indicating an index of a short-term and subband precoding matrix; or the first type of PMI is used for indicating an index of a long-term and wideband precoding matrix and an index of a short-term and wideband precoding matrix, and the second type of PMI is used for indicating an index of a short-term and subband precoding matrix; or the first type of PMI is used for indicating an index of a wideband precoding matrix, and the second type of PMI is used for indicating an index of a wideband precoding matrix.

According to an embodiment of the disclosure, a method for feeding back channel state information is provided. FIG. 1 is a flowchart illustrating a method for feeding back channel state information according to an embodiment of the disclosure, the method comprises the following Step S102 to Step S104.

Step S102: a UE determines channel state information which comprises a first type of PMI and a second type of PMI.

Step S104: the UE feeds back the channel state information which comprises the first type of PMI and the second type of PMI on a PUSCH.

In the related technology, since the PMIs are not fed back differently, the precision of the fed-back channel state information is insufficient, thus failing to meet the requirement of high precision of the channel state information under the transmission mode of dynamic switching between SU-MIMO and MU-MIMO. In the embodiment of the disclosure, the distinguished PMIs are included in the contents of the channel state information to greatly increase the precision of the channel state information, thus the base station is able to learn the real-time conditions of the channel according to the fed-back channel state information so that SU-MIMO transmission, MU-MIMO transmission and SU-MIMO/MU-MIMO dynamic switching transmission can be supported to improve the system performance significantly.

Preferably, in Step S102, the UE can determine a transmission mode according to a configuration signalling. Under the new mixed transmission mode, a feedback mode is determined according to the configuration signalling. Under the determined feedback mode, the fed-back channel state information comprises at least one of a first type of PMI and a second type of PMI.

In the above, the first type of PMI is used for indicating the index of a first precoding matrix in a first precoding codebook and each first precoding matrix is used for mapping channel information of one wideband and/or long-term channel; the second of PMI is used for indicating the index of a second precoding matrix in a second precoding codebook and each second precoding matrix is used for mapping channel information of one subband and/or short-term channel.

In the above, the transmission mode is a new mixed transmission mode and at least supports one of the following three transmission modes: SU-MIMO, MU-MIMO, and SU-MIMO and MU-MIMO switching transmission mode, to meet the requirement of the LTE-A.

Preferably, the channel state information further comprises: RI information and/or CQI information.

Preferably, the step in which the UE feeds back the channel state information which comprises the first type of PMI and the second type of PMI on the PUSCH comprises that: the UE feeds back the first type of PMI and the second type of PMI on the PUSCH using Mode 1-2, i.e. a wideband feedback mode.

Preferably, the step in which the UE feeds back the first type of PMI and the second type of PMI on the PUSCH using Mode 1-2, i.e. the wideband feedback mode comprises that: when RI≤a0 and a0 is a positive integer which is greater than or equal to 2, the UE selects the first precoding matrix corresponding to a subband set from the first stored precoding codebook and feeds back the index number of the selected first precoding matrix as the first type of PMI of the subband set.

Preferably, the step in which the UE feeds back the first type of PMI and the second type of PMI on the PUSCH using Mode 1-2, i.e. the wideband feedback mode comprises that: when RI≤a0 and a0 is a positive integer which is greater than or equal to 2, the UE selects the second precoding matrix corresponding to a subband set from the second stored precoding codebook, selects a second precoding matrix corresponding to each subband in the subband set from the second stored precoding codebook, and feeds back the index number of the second precoding matrix of the selected subband set and the index number of the selected second precoding matrix of each subband in the subband set as the second type of PMI.

Preferably, the step in which the UE feeds back the first type of PMI and the second type of PMI on the PUSCH using Mode 1-2, i.e. the wideband feedback mode comprises that: when RI<a0 and a0 is a positive integer which is greater than or equal to 2, the UE selects the second precoding matrix, with a fixed value, corresponding to a subband set from the second stored precoding codebook, selects the second precoding matrix corresponding to each subband in the subband set from the second precoding codebook, and feeds back the index number of the selected second precoding matrix of each subband in the subband set as the second type of PMI.

Preferably, the step in which the UE feeds back the first type of PMI and the second type of PMI on the PUSCH using Mode 1-2, i.e. the wideband feedback mode comprises that: when RI>a0 and a0 is a positive integer which is greater than or equal to 2, the UE selects the first precoding matrix corresponding to a subband set from the first stored precoding codebook and feeds back the index number of the selected first precoding matrix as the first type of PMI of the subband set.

Preferably, the step in which the UE feeds back the first type of PMI and the second type of PMI on the PUSCH using Mode 1-2, i.e. the wideband feedback mode comprises that: when RI>a0 and a0 is a positive integer which is greater than or equal to 2, the UE selects the second precoding matrix corresponding to a subband set from the second stored precoding codebook and feeds back the index number of the selected second precoding matrix as the second type of PMI of the subband set.

Preferably, the step in which the UE feeds back the first type of PMI and the second type of PMI on the PUSCH using Mode 1-2, i.e. the wideband feedback mode comprises that: the UE selects the second precoding matrix, with a fixed value, corresponding to the subband set from the second stored precoding codebook and the index number of the selected second precoding matrix is not fed back as the second type of PMI of the subband set.

Preferably, the step in which the UE feeds back the first type of PMI and the second type of PMI on the PUSCH comprises that: the UE feeds back the first type of PMI and the second type of PMI on the PUSCH using Mode 2-2, i.e. a UE-selected subband feedback mode.

Preferably, the step in which the UE feeds back the first type of PMI and the second type of PMI on the PUSCH using Mode 2-2, i.e. the UE-selected subband feedback mode comprises that: when RI≤a0 and a0 is a positive integer which is greater than or equal to 2, the UE selects M subbands from a subband set; the UE selects the first precoding matrix corresponding to the M subbands from the first stored precoding codebook, and feeds back the index number of the selected first precoding matrix as the first type of PMI of the M subbands; the UE selects the second precoding matrix corresponding to the M subbands from the second stored precoding codebook, and feeds back the index number of the selected second precoding matrix as the second type of PMI of the M subbands.

Preferably, the step in which the UE feeds back the first type of PMI and the second type of PMI on the PUSCH using Mode 2-2, i.e. the UE-selected subband feedback mode comprises that: when RI≤a0 and a0 is a positive integer which is greater than or equal to 2, the UE selects M subbands from a subband set; the UE selects the second precoding matrix corresponding to the M subbands from the second stored precoding codebook, and feeds back the index number of the selected second precoding matrix as the second type of PMI of the M subbands.

Preferably, the step in which the UE feeds back the first type of PMI and the second type of PMI on the PUSCH using Mode 2-2, i.e. the UE-selected subband feedback mode comprises that: when RI≤a0 and a0 is a positive integer which is greater than or equal to 2, the UE selects M subbands from a subband set; the UE selects the first precoding matrix corresponding to the M subbands from the first stored precoding codebook, and feeds back the index number of the selected first precoding matrix as the first type of PMI of the M subbands; the UE selects the second precoding matrix corresponding each subband in the M subbands from the second stored precoding codebook, and feeds back the index number of the selected second precoding matrix as the second type of PMI of each subband in the M subbands.

Preferably, the step in which the UE feeds back the first type of PMI and the second type of PMI on the PUSCH using Mode 2-2, i.e. the UE-selected subband feedback mode comprises that: when RI≤a0 and a0 is a positive integer which is greater than or equal to 2, the UE selects the first precoding matrix corresponding to a subband set from the first stored precoding codebook, and feeds back the index number of the selected first precoding matrix as the first type of PMI of the subband set.

Preferably, the step in which the UE feeds back the first type of PMI and the second type of PMI on the PUSCH using Mode 2-2, i.e. the UE-selected subband feedback mode comprises that: when RI≤a0 and a0 is a positive integer which is greater than or equal to 2, the UE selects the second precoding matrix corresponding to a subband set from the second stored precoding codebook, and feeds back the index number of the selected second precoding matrix as the second type of PMI of the subband set.

Preferably, the step in which the UE feeds back the first type of PMI and the second type of PMI on the PUSCH using Mode 2-2, i.e. the UE-selected subband feedback mode comprises that: when RI≤a0 and a0 is a positive integer which is greater than or equal to 2, the UE selects the second precoding matrix, with a fixed value, corresponding to a subband set from the second stored precoding codebook, and does not feed the index number of the selected second precoding matrix back as the second type of PMI of the subband set.

Preferably, the step in which the UE feeds back the first type of PMI and the second type of PMI on the PUSCH using Mode 2-2, i.e. the UE-selected subband feedback mode comprises that: when RI>a0 and a0 is a positive integer which is greater than or equal to 2, the UE selects M subbands from a subband set; the UE selects the first precoding matrix corresponding to the M subbands from the first stored precoding codebook, and feeds back the index number of the selected first precoding matrix as the first type of PMI of the subband set.

Preferably, the step in which the UE feeds back the first type of PMI and the second type of PMI on the PUSCH using Mode 2-2, i.e. the UE-selected subband feedback mode comprises that: when RI>a0 and a0 is a positive integer which is greater than or equal to 2, the UE selects M subbands from a subband set; the UE selects the first precoding matrix corresponding to the M subbands from the first stored precoding codebook, and feeds back the index number of the selected first precoding matrix as the first type of PMI of the subband set; the UE selects the second precoding matrix, with a fixed value, corresponding to the M subbands from the second stored precoding codebook, and does not feed the index number of the selected second precoding matrix back as the second type of PMI of the subband set.

Preferably, the step in which the UE feeds back channel state information comprising the first type of PMI and the second type of PMI on the PUSCH comprises that: the UE feeds back the first type of PMI and the second type of PMI using Mode 3-1, i.e. a high layer configured feedback mode.

Preferably, the step in which the UE feeds back the first type of PMI and the second type of PMI using Mode 3-1, i.e. the high layer configured feedback mode comprises that: the UE selects the first precoding matrix corresponding to a subband set from the first stored precoding codebook, and feeds back the index number of the selected first precoding matrix as the first type of PMI of the subband set.

Preferably, the step in which the UE feeds back the first type of PMI and the second type of PMI using Mode 3-1, i.e.

the high layer configured feedback mode comprises that: the UE selects the second precoding matrix corresponding to the subband set from the second stored precoding codebook, and feeds back the index number of the selected second precoding matrix as the second type of PMI of the subband set.

Preferably, the step in which the UE feeds back the first type of PMI and the second type of PMI using Mode 3-1, i.e. the high layer configured feedback mode comprises that: the UE selects the second precoding matrix, with a fixed value, corresponding to the subband set from the second stored precoding codebook, and does not feed the index number of the selected second precoding matrix back as the second type of PMI of the subband set.

In order to help understand the embodiments above, a plurality of other preferable embodiments of the disclosure are further described below.

Preferable Embodiment 1

Figure 2:
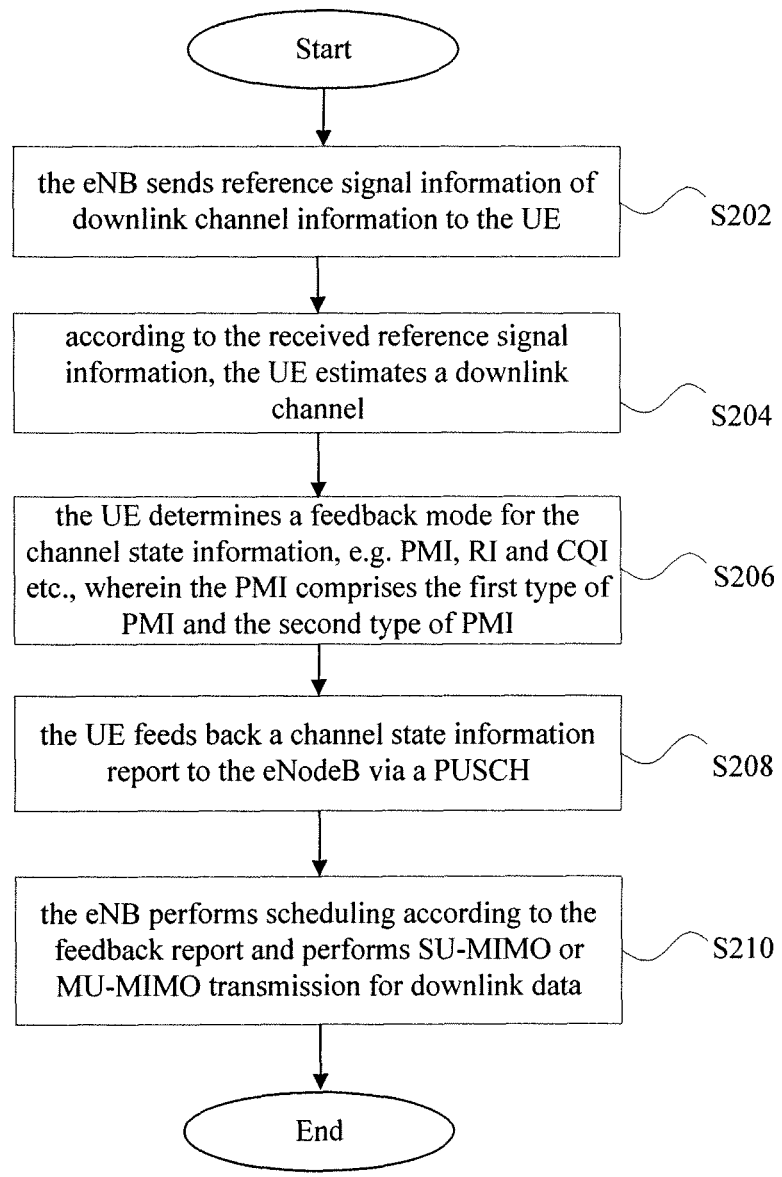
FIG. 2 is a flowchart illustrating a method for feeding back channel state information according to a preferable Embodiment 1 of the disclosure.

FIG. 2 is a flowchart illustrating a method for feeding back channel state information according to the preferable Embodiment 1 of the disclosure. The method comprises the following Step S202 to Step S210.

Step S202: a transmitting node sends to a UE a reference signal which is used for measuring the downlink channel state by the UE.

In this step, the transmitting node can be a base station (also can be referred to as eNodeB), but is not limited thereto.

Step S204: the UE estimates a downlink channel according to the received reference signal information.

Step S206: the UE determines, according to indication information, a format for feeding back a channel state information report.

In this step, the indication information is high layer configuration signalling information. The channel state information can comprise a number of pieces of PMI information, a number of pieces of CQI information and RI information, wherein the PMI information comprises the first type of PMI and the second type of PMI.

Step S208: the UE feeds back a channel state information report to the transmitting node via the PUSCH.

Step S210: the transmitting node performs scheduling according to the channel state information fed back by the UE to realize transmission of SU-MIMO or MU-MIMO.

Preferable Embodiment 2

The method for feeding back channel state information in the preferable Embodiment 2 comprises steps as follows.

Under a single transmission mode, e.g. the mixed transmission mode etc., according to the indication information, the UE determines the contents carried in the channel state information, wherein the indication information is the high layer configuration signalling information delivered by a base station (also can be referred to as eNodeB).

The UE sends the channel state information to the eNodeB, wherein the channel state information comprises at least one of the followings: a first type of PMI, a second type of PMI, RI and CQI information, wherein the first type of PMI and the second type of PMI are fed back and transmitted aperiodically on a PUSCH. The more contents are included in the channel state information, the more easily the information precision can be increased.

In this embodiment, the UE determines a transmission mode according to a configuration signalling. Under a new mixed transmission mode, a feedback mode is determined according to the configuration signalling so as to further determine the contents carried by the channel state information.

In the preferable Embodiment 2, the first type of PMI and the second type of PMI are fed back on the PUSCH via the wideband feedback mode, i.e. a feedback mode of a single CQI and a plurality of PMIs, which is recorded as Mode 1-2.

When RI is smaller than or equal to a0:

under Mode 1-2, a preferred second precoding matrix W1 is selected for a subband set S from a first precoding codebook, a preferred second precoding matrix W2 is selected for the subband set S from a second precoding codebook, and a preferred second precoding matrix W2 is selected for each subband from the second precoding codebook; the UE feeds back the 4-bit wideband CQI of each codeword stream and does not apply the differential CQI format; the UE feeds back the first type of PMI of one wideband and feeds back the second type of PMI of each subband; under a single transmission mode, the CQI/PMI is calculated based on the feedback of the RI;

or, under Mode 1-2, a preferred second precoding matrix W1 is selected for a subband set S from a first precoding codebook, a second precoding matrix W2 with a fixed value is selected for the subband set S, and a preferred second precoding matrix W2 is selected for each subband from the second precoding codebook; the UE feeds back the 4-bit wideband CQI of each codeword stream and does not apply the differential CQI format; the UE feeds back the first type of PMI of a wideband and feeds back the second type of PMI of each subband; under a single transmission mode, the CQI/PMI is calculated based on the feedback of the RI.

When RI is greater than or equal to a0, the following three methods can be applied.

The first method: a preferred first precoding matrix W1 is selected for a subband set S from a first precoding codebook, a preferred second precoding matrix W2 is selected for the subband set S from a second precoding codebook; the UE feeds back the 4-bit wideband CQI of each codeword stream and does not apply the differential CQI format; the UE feeds back the PMI of each subband; under a single transmission mode, the CQI/PMI is calculated based on the feedback of the RI.

The second method: a preferred first precoding matrix W1 is selected for a subband set S from a first precoding codebook, a preferred second precoding matrix W2 with a fixed value is selected for the subband set S from a second precoding codebook; the UE feeds back the 4-bit wideband CQI of each codeword stream and does not apply the differential CQI format; the UE feeds back the PMI of each subband; under a single transmission mode, the CQI/PMI is calculated based on the feedback of the RI.

The third method: a preferred first precoding matrix W1 is selected for a subband set S from a first precoding codebook; the feeds back the 4bit wideband CQI of each codeword stream and does not apply the differential CQI format; the UE feeds back the first type of PMI indicating the index of the first precoding matrix; under a single transmission mode, the CQI/PMI is calculated based on the feedback of the RI.

In the above, a0 is a positive integer which is greater than or equal to 2.

Preferable Embodiment 3

The method for feeding back channel state information in the preferable Embodiment 3 comprises the steps as follows.

Under a single transmission mode, the UE determines, according to indication information, the contents carried by the channel state information, wherein the indication information is the high layer configuration signalling information delivered by a base station (also can be referred to as eNodeB).

The UE sends the channel state information to the eNodeB, wherein the channel state information comprises at least one of the followings: a first type of PMI, a second type of PMI, RI and CQI information, wherein the first type of PMI and the second type of PMI are fed back and transmitted on a PUSCH.

In this embodiment, the first type of PMI and the second type of PMI are fed back on the PUSCH via the UE-selected subband mode, i.e. Mode 2-2, i.e. a feedback mode of a plurality of CQIs and a plurality of PMIs.

Under Mode 2-2, when RI is smaller than or equal to a0, there are six situations as follows.

Situation 1:

The UE selects M preferred subbands, each of which has a size of k, from a subband set S. The UE selects one preferred first precoding matrix for these M subbands from a codebook subset, and selects one preferred second precoding matrix for these M subbands from the codebook subset. For each codeword stream, the UE feeds back one subband CQI for the selected M subbands; for the M subbands, the UE feeds back two PMIs, one of which is the first type of PMI for indicating the first precoding matrix and the other one is the second type of PMI for indicating the second precoding matrix. The UE selects one preferred first precoding matrix for the whole subband set S from the codebook subset, and selects one preferred second precoding matrix for the whole subband set S from the codebook subset. For each codeword stream, the UE feeds back one wideband CQI for the whole subband set S; for the whole bandwidth (subband set S), the UE feeds back two PMIs, one of which is the first type of PMI for indicating the first precoding matrix and the other one is the second type of PMI for indicating the second precoding matrix. Calculation of the CQI/PMI is limited by the feedback of the RI.

Or Situation 2:

The UE selects M preferred subbands, each of which has a size of k, from a subband set S. The UE selects one preferred second precoding matrix for these M subbands from a codebook subset. For each codeword stream, the UE feeds back one subband CQI for the selected M subbands; for the M subbands, the UE feeds back two PMIs, one of which is the first type of PMI for indicating the first precoding matrix and the other one is the second type of PMI for indicating the second precoding matrix. The UE selects one preferred second precoding matrix for the whole subband set S from the codebook subset. For each codeword stream, the UE feeds back one wideband CQI for the whole subband set S; for the whole bandwidth (subband set S), the UE feeds back one PMI, which is the first type of PMI for indicating the first precoding matrix. Calculation of the CQI/PMI is limited by the feedback of the RI.

Or Situation 3:

The UE selects M preferred subbands, each of which has a size of k, from a subband set S. The UE selects one preferred first precoding matrix for these M subbands from a codebook subset, and selects one preferred second precoding matrix for each subband in these M subbands from the codebook subset. For each codeword stream, the UE feeds back one subband CQI for the selected M subbands; for the M subbands, the UE feeds back M+1 PMIs, one of which is the first type of PMI for indicating the first precoding matrix and the other M ones are the second type of PMI for indicating the second precoding matrix. The UE selects one preferred first precoding matrix for the whole subband set S from the codebook subset, and selects one preferred second precoding matrix for the whole subband set S from the codebook subset. For each codeword stream, the UE feeds back one wideband CQI for the whole subband set S; for the whole bandwidth (subband set S), the UE feeds back two PMIs, one of which is the first type of PMI for indicating the first precoding matrix and the other one is the second type of PMI for indicating the second precoding matrix. Calculation of the CQI/PMI is limited by the feedback of the RI.

Or Situation 4:

Situation 4 is the same as Situation 1, except that the procedure in Situation 1 of selecting one preferred second precoding matrix for the whole subband set S from a codebook subset and feeding back the corresponding second type of PMI is not included in Situation 4. In this situation, one second precoding matrix with a fixed value is selected for the whole subband set S, or a second precoding matrix is not selected, therefore the second type of PMI of the whole subband set S does not need to be fed back.

Or Situation 5:

Situation 5 is the same as Situation 2, except that the procedure in Situation 2 of selecting one preferred second precoding matrix for the whole subband set S from a codebook subset and feeding back the corresponding second type of PMI is not included in Situation 5. In this situation, one second precoding matrix with a fixed value is selected for the whole subband set S, or a second precoding matrix is not selected, therefore the second type of PMI of the whole subband set S does not need to be fed back.

Or Situation 6:

Situation 6 is the same as Situation 3, except that the procedure in Situation 3 of selecting one preferred second precoding matrix for the whole subband set S from a codebook subset and feeding back the corresponding second type of PMI is not included in Situation 6. In this situation, one second precoding matrix with a fixed value is selected for the whole subband set S, or a second precoding matrix is not selected, therefore the second type of PMI of the whole subband set S does not need to be fed back.

Under Mode 2-2, when RI is greater than a0, the UE selects M preferred subbands, each of which has a size of k, from a subband set S; selects one preferred first precoding matrix for these M subbands from a codebook subset, and selects one preferred or fixed-value second precoding matrix for these M subbands or does not select the second precoding matrix; for each codeword stream, the UE feeds back one subband CQI for the selected M subbands; the UE feeds back one first type of PMI for the M subbands; the UE selects one preferred first precoding matrix for the whole subband set S, and selects one second precoding matrix with a fixed value for the whole subband set S or does not select the second precoding matrix; for each codeword stream, the UE feeds back one wideband CQI for the whole subband set S; the UE feeds back one PMI for the whole bandwidth (subband set S); calculation of the CQI/PMI is limited by the feedback of the RI.

Here, an embodiment of the disclosure further comprises that: a fixed second precoding matrix W2 is selected for a subband set S from a second precoding codebook and only one PMI of the subband set S needs to be fed back at the moment.

Here, an embodiment of the disclosure further comprises that: a fixed second precoding matrix W2 is selected for a subband set S from a second precoding codebook and only one preferred PMI of M preferred subbands is needed at the moment.

Preferable Embodiment 4

The method for feeding back channel state information in the preferable Embodiment 4 comprises the steps as follows.

Under a single transmission mode, the UE determines, according to indication information, the contents carried in the channel state information, wherein the indication information is the high layer configuration signalling information delivered by a base station (also can be referred to as eNodeB).

The UE sends the channel state information to the eNodeB, wherein the channel state information comprises at least one of the followings: a first type of PMI, a second type of PMI, RI and CQI information, wherein the first type of PMI and the second type of PMI are fed back and transmitted on a PUSCH.

In this embodiment, the first type of PMI and the second type of PMI are fed back on the PUSCH via the high layer configured subband feedback mode, i.e. Mode 3-1, i.e. the feedback mode of a single CQI and a plurality of PMIs.

Under Mode 3-1, one preferred first precoding matrix W1 is selected for the whole subband set S from a codebook subset, and one preferred second precoding matrix W2 is selected for the whole subband set S from the codebook subset; for each codeword stream, the UE feeds back one wideband CQI for the whole subband set S; for the whole bandwidth (subband set S), the UE feeds back two PMIs, one of which is the first type of PMI for indicating the W1 and the other one is the second type of PMI for indicating the W2; calculation of the CQI/PMI is limited by the feedback of the RI.

Or,

Under Mode 3-1, one preferred first precoding matrix W1 is selected for the whole subband set S from a codebook subset, and one preferred second precoding matrix W2 with a fixed value is selected for the whole subband set S; for each codeword stream, the UE feeds back one wideband CQI for the whole subband set S; for the whole bandwidth (subband set S), the UE feeds back one PMI which is the first type of PMI for indicating the W1; calculation of the CQI/PMI is limited by the feedback of the RI.

Here, an embodiment of the disclosure further comprises that: a fixed second precoding matrix W2 is selected for a subband set S from a second precoding codebook, and only one PMI of the subband set S needs to be fed back.

What needs to be explained is that the steps as shown in the flowcharts of the accompanying drawings can be performed in a computer system which can execute computer instructions. In addition, although logical orders have been shown in the flowcharts, the shown or described steps can be performed according to different orders under some circumstances.

Figure 3:
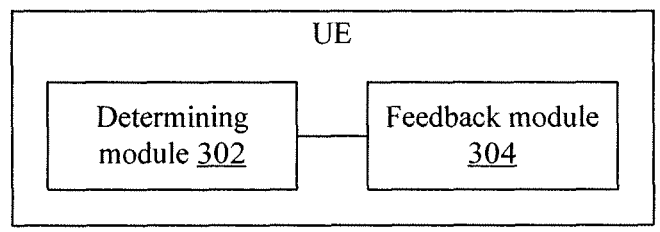
FIG. 3 is a structural block diagram illustrating a terminal according to an embodiment of the disclosure.

FIG. 3 is a structural block diagram illustrating a terminal according to an embodiment of the disclosure. The terminal can be used for realizing the aforementioned method for feeding back channel state information and comprises a determining module 302 and a feedback module 304. The structure of the terminal is described in details below.

The determining module 302 is configured to determine channel state information which comprises a first type of PMI and a second type of PMI, wherein the first type of PMI is used for indicating the index of a first precoding matrix in a first precoding codebook, the first precoding matrix is used for mapping channel information of a wideband and/or long-term channel, the second type of PMI is used for indicating the index of a second precoding matrix in a second precoding codebook, the second precoding matrix is used for mapping channel information of a subband and/or short-term channel; the feedback module 304 is coupled with the determining module 302 and configured to, feed the channel state information, which comprises the first type of PMI and the second type of PMI and is determined by the determining module 302, back on a PUSCH.

In the related technology, since the PMIs are not fed back differently, the precision of the fed-back channel state information is insufficient, thus failing to meet the requirement of high precision of the channel state information under the transmission mode of dynamic switching between SU-MIMO and MU-MIMO. In the embodiment of the disclosure, the distinguished PMIs are included in the contents of the channel state information by the determining module 302 to greatly increase the precision of the channel state information, thus the base station is able to learn the real-time conditions of the channel according to the channel state information fed back by the feedback module 304 so that SU-MIMO transmission, MU-MIMO transmission and SU-MIMO/MU-MIMO dynamic switching transmission can be supported to improve the system performance significantly.

To sum up, according to the embodiments above of the disclosure, a method and a terminal for feeding back the channel state information are provided. Under the transmission mode of dynamic switching between SU-MIMO and MU-MIMO, the necessary first type of PMI and/or second type of PMI are included in the channel state information, thus increasing the precision of the channel state information fed back by the UE so that the base station is able to dynamically select the SU-MIMO transmission or the MU-MIMO transmission according to the practical channel condition so as to improve the system performance significantly.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method for feeding back channel state information, comprising:

a user equipment (UE) determining channel state information which comprises a first type of Preceding Matrix Indicator (PMI) and a second type of PMI, wherein the first type of PMI is used for indicating an index of a first preceding matrix in a first preceding codebook, the first preceding matrix is used for mapping channel information of a wideband and/or long-term channel, the second type of PMI is used for indicating an index of a second preceding matrix in a second preceding codebook, and the second preceding matrix is used for mapping channel information of a subband and/or short-term channel; and the UE feeding back the channel state information which comprises the first type of PMI and the second type of PMI on a Physical Uplink Shared Channel (PUSCH), to inform a base station of acquiring channel information according to a predetermined function of the first preceding matrix and the second preceding matrix;

wherein the channel state information further comprises:
Rank Indicator (RI) information and/or Channel Quality Indication (CQI) information;
wherein the step of the UE feeding back the channel state information which comprises the first type of PMI and the second type of PMI on the PUSCH comprises:
the UE feeding back the first type of PMI and the second type of PMI on the PUSCH using a wideband feedback mode; or, the UE feeding back the first type of PMI and the second type of PMI on the PUSCH using a UE-selected subband feedback mode; or, the UE feeding back the first type of PMI and the second type of PMI using a high layer configured feedback mode;
wherein the UE feeding back the first type of PMI and the second type of PMI on the PUSCH using a wideband feedback mode comprises: when RI>a0 and a0 is a positive integer which is greater than or equal to 2, the UE selecting the first precoding matrix corresponding to a subband set from the first stored precoding codebook, and feeding back an index number of the selected first precoding matrix as the first type of PMI of the subband set; when RI>a0 and a0 is a positive integer which is greater than or equal to 2, the UE selecting the second precoding matrix, with a fixed value, corresponding to a subband set from the second stored precoding codebook and not feeding back an index number of the selected second precoding matrix as the second type of PMI of the subband set;
wherein the UE feeding back the first type of PMI and the second type of PMI on the PUSCH using a UE-selected subband feedback mode comprises: the UE selecting the first precoding matrix corresponding to a subband set from the first stored precoding codebook, and feeding back an index number of the selected first precoding matrix as the first type of PMI of the subband set; when RI≤a0 and a0 is a positive integer which is greater than or equal to 2, the UE selecting the second precoding matrix corresponding to the subband set from the second stored precoding codebook, and feeding back an index number of the selected second precoding matrix as the second type of PMI of the subband set; and/or, when RI≤a0 and a0 is a positive integer which is greater than or equal to 2, the UE selecting the second precoding matrix, with a fixed value, corresponding to the subband set from the second stored precoding codebook, and not feeding back an index number of the selected second precoding matrix as the second type of PMI of the subband set;
wherein the UE feeding back the first type of PMI and the second type of PMI using a high layer configured feedback mode comprises: the UE selecting the first precoding matrix corresponding to a subband set from the first stored precoding codebook, and feeding back an index number of the selected first precoding matrix as the first type of PMI of the subband set;
when RI≤a0 and a0 is a positive integer which is greater than or equal to 2, the UE selecting the second precoding matrix corresponding to the subband set from the second stored precoding codebook, and feeding back an index number of the selected second precoding matrix as the second type of PMI of the subband set; and/or, when RI>a0 and a0 is a positive integer which is greater than or equal to 2, the UE selecting the second precoding matrix, with a fixed value, corresponding to the subband set from the second stored precoding codebook, and not feeding back an index number of the selected second precoding matrix as the second type of PMI of the subband set.

2. The method according to claim 1, wherein the step of the UE feeding back the first type of PMI and the second type of PMI on the PUSCH using the wideband feedback mode comprises:
when RI≤a0 and a0 is a positive integer which is greater than or equal to 2, the UE selecting the second precoding matrix corresponding to a subband set from the second stored precoding codebook, selecting the second precoding matrix corresponding to each subband in the subband set from the second stored precoding codebook, and feeding back an index number of the selected second precoding matrix of the subband set and an index number of the selected second precoding matrix of each subband in the subband set as the second type of PMI; and/or,
when RI≤a0 and a0 is a positive integer which is greater than or equal to 2, the UE selecting the second precoding matrix, with a fixed value, corresponding to a subband set from the second stored precoding codebook, selecting the second precoding matrix corresponding to each subband in the subband set from the second stored precoding codebook, and feeding back an index number of the selected second precoding matrix of each subband in the subband set as the second type of PMI.

3. The method according to claim 1, wherein the step of the UE feeding back the first type of PMI and the second type of PMI on the PUSCH using the UE-selected subband feedback mode comprises:
when RI≤a0 and a0 is a positive integer which is greater than or equal to 2,
the UE selecting M subbands from a subband set;
the UE selecting the first precoding matrix corresponding to the M subbands from the first stored precoding codebook, and feeding back an index number of the selected first precoding matrix as the first type of PMI of the M subbands;
the UE selecting the second precoding matrix corresponding to the M subbands from the second stored precoding codebook, and feeding back an index number of the selected second precoding matrix as the second type of PMI of the M subbands.

4. The method according to claim 1, wherein the step of the UE feeding back the first type of PMI and the second type of PMI on the PUSCH using the UE-selected subband feedback mode comprises:
when RI≤a0 and a0 is a positive integer which is greater than or equal to 2,
the UE selecting M subbands from a subband set;
the UE selecting the second precoding matrix corresponding to the M subbands from the second stored precoding codebook, and feeding back an index number of the selected second precoding matrix as the second type of PMI of the M subbands.

5. The method according to claim 1, wherein the step of the UE feeding back the first type of PMI and the second type of PMI on the PUSCH using the UE-selected subband feedback mode comprises:
when RI≤a0 and a0 is a positive integer which is greater than or equal to 2,
the UE selecting M subbands from a subband set;
the UE selecting the first precoding matrix corresponding to the M subbands from the first stored precoding codebook, and feeding back an index number of the selected first precoding matrix as the first type of PMI of the M subbands;
the UE selecting the second precoding matrix corresponding to each subband in the M subbands from the second stored precoding codebook, and feeding back an index number of the selected second precoding matrix as the second type of PMI of each subband in the M subbands.

6. The method according to claim 1, wherein the step of the UE feeding back the first type of PMI and the second type of PMI on the PUSCH using the UE-selected subband feedback mode comprises:
when RI>a0 and a0 is a positive integer which is greater than or equal to 2,
the UE selecting M subbands from a subband set;
the UE selecting the first precoding matrix corresponding to the M subbands from the first stored precoding codebook, and feeding back an index number of the selected first precoding matrix as the first type of PMI of the subband set.

7. The method according to claim 1, wherein the step of the UE feeding back the first type of PMI and the second type of PMI on the PUSCH using the UE-selected subband feedback mode comprises:
when RI>a0 and a0 is a positive integer which is greater than or equal to 2,
the UE selecting M subbands from a subband set;
the UE selecting the first precoding matrix corresponding to the M subbands from the first stored precoding codebook, and feeding back an index number of the selected first precoding matrix as the first type of PMI of the subband set;
the UE selecting the second precoding matrix, with a fixed value, corresponding to the M subbands from the second stored precoding codebook, and not feeding back an index number of the selected second precoding matrix as the second type of PMI of the subband set.

8. The method according to claim 1, wherein the step of the UE determining the channel state information which comprises the first type of PMI and the second type of PMI comprises:
the UE receiving high layer configuration signalling information used for indicating a mode of the UE from a base station;
according to the high layer configuration signalling information, the UE determining the mode, and determining the channel state information which comprises the first type of PMI and the second type of PMI.

9. The method according to claim 8, wherein the mode comprises a mixed transmission mode which is used for supporting at least one of the following transmission modes: Single-User Multiple-input Multiple-output (SU-MIMO) transmission, Multi-User MIMO (MU-MIMO) transmission, and SU-MIMO/MU-MIMO dynamic switching transmission.

10. A terminal, comprising a hardware processor, configured to:
determine channel state information which comprises a first type of PMI and a second type of PMI, wherein the first type of PMI is used for indicating an index of a first precoding matrix in a first precoding codebook, the first precoding matrix is used for mapping channel information of a wideband and/or long-term channel, the second type of PMI is used for indicating an index of a second precoding matrix in a second precoding codebook, and the second precoding matrix is used for mapping channel information of a subband and/or short-term channel; and
feed back the channel state information which comprises the first type of PMI and the second type of PMI on a PUSCH, to inform a base station of acquiring channel information according to a predetermined function of the first precoding matrix and the second precoding matrix;
wherein the channel state information further comprises: Rank Indicator (RI) information and/or Channel Quality Indication (CQI) information;
wherein the terminal is configured to feed back the channel state information which comprises the first type of PMI and the second type of PMI on the PUSCH by the following:
feeding back the first type of PMI and the second type of PMI on the PUSCH using a wideband feedback mode; or, feeding back the first type of PMI and the second type of PMI on the PUSCH using a UE-selected subband feedback mode; or, feeding back the first type of PMI and the second type of PMI using a high layer configured feedback mode;
wherein the terminal is configured to feed back the first type of PMI and the second type of PMI on the PUSCH using a wideband feedback mode by the following: when RI>a0 and a0 is a positive integer which is greater than or equal to 2, selecting the first precoding matrix corresponding to a subband set from the first stored precoding codebook, and feeding back an index number of the selected first precoding matrix as the first type of PMI of the subband set; when RI>a0 and a0 is a positive integer which is greater than or equal to 2, selecting the second precoding matrix, with a fixed value, corresponding to a subband set from the second stored precoding codebook and not feeding back an index number of the selected second precoding matrix as the second type of PMI of the subband set;
wherein the terminal is configured to feed back the first type of PMI and the second type of PMI on the PUSCH using a UE-selected subband feedback mode by the following: selecting the first precoding matrix corresponding to a subband set from the first stored precoding codebook, and feeding back an index number of the selected first precoding matrix as the first type of PMI of the subband set; when RI≤a0 and a0 is a positive integer which is greater than or equal to 2, selecting the second precoding matrix corresponding to the subband set from the second stored precoding codebook, and feeding back an index number of the selected second precoding matrix as the second type of PMI of the subband set; and/or, when RI>a0 and a0 is a positive integer which is greater than or equal to 2, selecting the second precoding matrix, with a fixed value, corresponding to the subband set from the second stored precoding codebook, and not feeding back an index number of the selected second precoding matrix as the second type of PMI of the subband set;
wherein the terminal is configured to feed back the first type of PMI and the second type of PMI using a high layer configured feedback mode by the following: selecting the first preceding matrix corresponding to a subband set from the first stored precoding codebook, and feeding back an index number of the selected first precoding matrix as the first type of PMI of the subband set; when RI≤a0 and a0 is a positive integer which is greater than or equal to 2, selecting the second precoding matrix corresponding to the subband set from the second stored precoding codebook, and feeding back an index number of the selected second precoding matrix as the second type of PMI of the subband set; and/or, when RI>a0 and a0 is a positive integer which is greater than or equal to 2, selecting the second precoding matrix, with a fixed value, corresponding to the subband set from the second stored precoding codebook, and not feeding back an index number of the selected second precoding matrix as the second type of PMI of the subband set.

* * * * *